United States Patent

Furuya

[11] Patent Number: 5,838,493
[45] Date of Patent: Nov. 17, 1998

[54] CABINET STRUCTURE OF MULTISCREEN DISPLAY

[75] Inventor: Keizo Furuya, Saitama-ken, Japan

[73] Assignee: Kabushiki Kaisha Toshiba, Kawasaki, Japan

[21] Appl. No.: 715,464

[22] Filed: Sep. 18, 1996

[30] Foreign Application Priority Data

Sep. 19, 1995 [JP] Japan .................................. 7-240095

[51] Int. Cl.⁶ .................................................. G03B 21/00
[52] U.S. Cl. ........................ 359/443; 359/460; 348/836; 348/839
[58] Field of Search ..................................... 359/443, 453, 359/456, 460; 348/836, 839, 840

[56] References Cited

U.S. PATENT DOCUMENTS

| 5,119,271 | 6/1992 | Aoki et al. ............................ 361/390 |
| 5,249,005 | 9/1993 | Furuno .................................. 353/94 |
| 5,382,990 | 1/1995 | Hata et al. . |
| 5,548,350 | 8/1996 | Yamada et al. ...................... 348/839 |
| 5,580,145 | 12/1996 | Yamada et al. ...................... 353/74 |

FOREIGN PATENT DOCUMENTS 0 650 295  4/1995  European Pat. Off. .
88 07 107  11/1988  Germany .
8-6504     1/1996   Japan .

*Primary Examiner*—Daniel P. Malley
*Attorney, Agent, or Firm*—Cushman Darby & Cushman IP Group of Pillsbury Madison & Sutro LLP

[57] ABSTRACT

It is possible to display enlarged images by arranging plural projectors having projecting parts (3) and screen parts (1) and projecting the images from said projecting parts on said screen parts. Each projector comprises a projecting part (3) for projecting the images, a screen part (1) for displaying the images projected from said projecting part to the front, and the screen part (1) is placed relatively retractably to said projecting part.

A frame (2) is placed between sad projecting part and said screen to make it protrudable and retractable. The frame (2) has rail members (2a–2d) united with said screen and is possible to house said projecting part in the frame.

It is possible to transport by housing said projecting part in said frame when transporting the projector and to project the images from the projecting part on the screen by separating the projecting part from the screen part when projecting the images by the projector

8 Claims, 11 Drawing Sheets

CABINET STRUCTURE OF MULTISCREEN DISPLAY

BACKGROUND OF THE INVENTION

1. Field of the Invention

The present invention relates to a multiscreen displaying apparatus and a cabinet structure of a projector unit used for it.

2. Description of the Related Art

A multiscreen displaying apparatus is a wide screen displaying apparatus formed by vertically and horizontally arranging a plurality of projectors. Each projector comprises a screen fixed to a fitting frame placed on the front and a projecting device located towards the rear. FIG. 10 is a sketch drawing of a cabinet of a projector unit used for a conventional multiscreen display.

As shown in FIG. 10, a screen part (a screen 1 and a fitting frame 1a) and a housing (a projecting part) 3 are connected with a frame 20. A frame structure is employed to lower costs and lighten weight. That is, the structure is simplified by only using necessary parts. Optical units and electric units for generating enlarged images on the screen 1 are housed in the projecting part 3. Enlarged image light is projected from the projecting part 3 on the back of the screen 1. FIG. 10 shows only lenses 3b of the optical units. Advantages of this arrangement are that it is possible to form a light, inexpensive projector unit and to obtain a similar effect even if plural projector units are piled up.

FIG. 11 shows a multiscreen displaying apparatus in which four projector units are arranged. As shown in FIG. 11, a multiscreen display apparatus is created by arranging four projector units. A multiscreen is formed by covering the frame parts 20 with outer plates 30a–30d and to shield outer light. Therefore, it is not necessary to provide an outer plate to each unit respectively and it is possible to form a light, inexpensive multiscreen displaying apparatus. It is to be understood that the more the number of units arranged increases, the ratio of the number of outer plates required with respect to the number of units decreases.

However, irrespective of such advantages, there are certain problems. First, although a lighter and lower-priced multiscreen displaying apparatus is formed by virtue of this frame structure, space is utilized in a poorly inefficient manner in transportation and storage because the size of the projector unit is large. Second, because there is no shielding part between the inner and outer parts of the apparatus, if it is left outside for a long time, dust and other particles can enter through the frame part 20 and adhere to the inside of the screen 1 or to the surface of the lens 3b, thereby degrading the quality of a picture when in use.

SUMMARY OF THE INVENTION

An object of the present invention is to provide a cabinet structure of a multiscreen displaying apparatus in which space in transporting and storing is efficiently utilized and dust and other particles do not enter through the frame part.

The present invention is a multiscreen displaying apparatus to achieve said object by arranging a plurality of projectors having projecting parts and screens. Each projector comprises a projecting part having optical means for projecting images.

A screen displays the images projected from said projecting part. The screen is retractable with respect to the projecting part.

A frame is mounted with respect to the projecting part and the screen. The frame is united with the screen and extends rearwardly from the back of the screen towards the projecting part. The frame is configured to house the projecting part inside of it. According to this construction, it is possible to transport the projector with the projecting part housed in the frame and to project images from the projecting part on the screen by separating the projecting part from the screen when projecting images.

Preferably, the frame comprises four L-shaped rail members extending rearwardly from the back of the screen towards the projecting part. The L-shaped rail members partially cover the edge parts of the projecting part. A frame member connects the ends of the L-shaped rail members.

Therefore, it is possible to move the screen part in an extensible and retractable manner with respect to the projecting part by virtue of the rail members.

Furthermore, according to the present invention, the projecting part is also provided with leg parts at the bottom surface of the forward end thereof and at the bottom surface of the rearward end thereof. The projecting part is also provided with leg supports at the upper surface of the forward end thereof and at the upper surface of the rearward end thereof. These leg parts and supports stabilize the multiscreen displaying apparatus as a plurality of the projectors are stacked up.

DETAILED DESCRIPTION OF THE PREFERRED EMBODIMENTS

Embodiments will be described referring to drawings.

Figure 1:
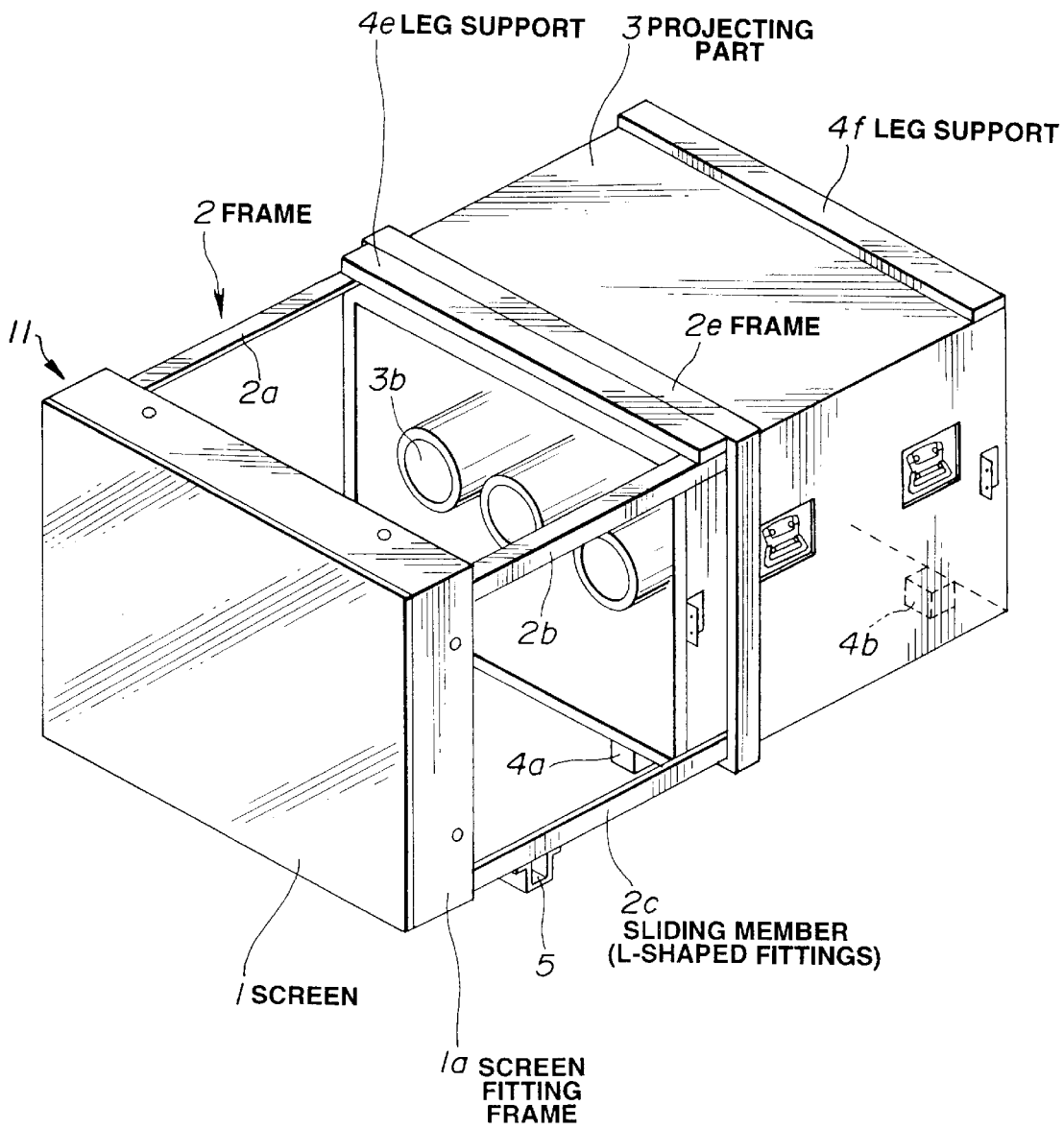
FIG. 1 is a perspective view showing the cabinet structure of a projector unit of a multiscreen displaying apparatus of an embodiment according to the present invention.

FIG. 1 shows the cabinet structure of a projector unit of a multiscreen displaying apparatus of an embodiment according to the present invention. The multiscreen displaying apparatus makes it possible to display a large screen by vertically and/or horizontally arranging plural projectors.

As shown in FIG. 1, the projector comprises a screen 1 and a projecting part 3. The screen 1 is held by a rectangular screen fitting frame 1a. L-shaped rail metal fittings 2a–2d function as sliding members and are fixed to four corners of the fitting frame 1a. The screen fitting frame 1a is larger than the outer periphery of the projecting part 3. One end of each L-shaped metal fitting 2a–2d extends rearwardly towards the projecting part 3 and another end is fixed respectively in the inner part of the fitting frame 1a. Furthermore, a frame 2e enclosing the outer periphery of the projecting part is provided on the front side of the projecting part 3. The rearward ends of the L-shaped metal fittings 2a–2d are fixed to the frame 2e. The frame 2 composed of the L-shaped metal rail fittings 2a–2d and the frame 2e is larger than the outer periphery of the projecting part 3. These L-shaped metal rail fittings 2a–2d are capable of being extended and retracted with respect to the projecting part 3 so as to cover the four corners defined by the four walls of the projecting part 3. Therefore, it is possible to house the projecting part 3 in a frame comprising these metal fittings 2a–2d and the frame 2e. The frame 2 can be moved together with the screen 1 forwardly and rearwardly with respect to projecting part 3.

The projecting part 3 has an optical unit 3b. Furthermore, leg parts 4a–4d (only 4a and 4b are shown in FIG. 1.) are provided at the bottom in order to allow the L-shaped metal fittings 2a–2d to move easily. The leg parts 4a, 4c and 4b, 4d are provided at the front and rear ends of the bottom of the projecting part 3. The L-shaped metal fittings 2c and 2d are also provided with a leg part 5 having the same size as that of each of the leg parts 4a–4d to prevent the screen from being inclined or falling down when the screen is extended outwards. Furthermore, leg supports 4e and 4f are provided at the upper part of the frame 2e and at the upper part on the back of the projecting part 3.

The frame 2 is larger than the projecting part 3 in the present invention so that the projecting part 3 can be housed inside it. Therefore, the projecting part 3 is simply formed as a box without useless processing.

Figure 2A:
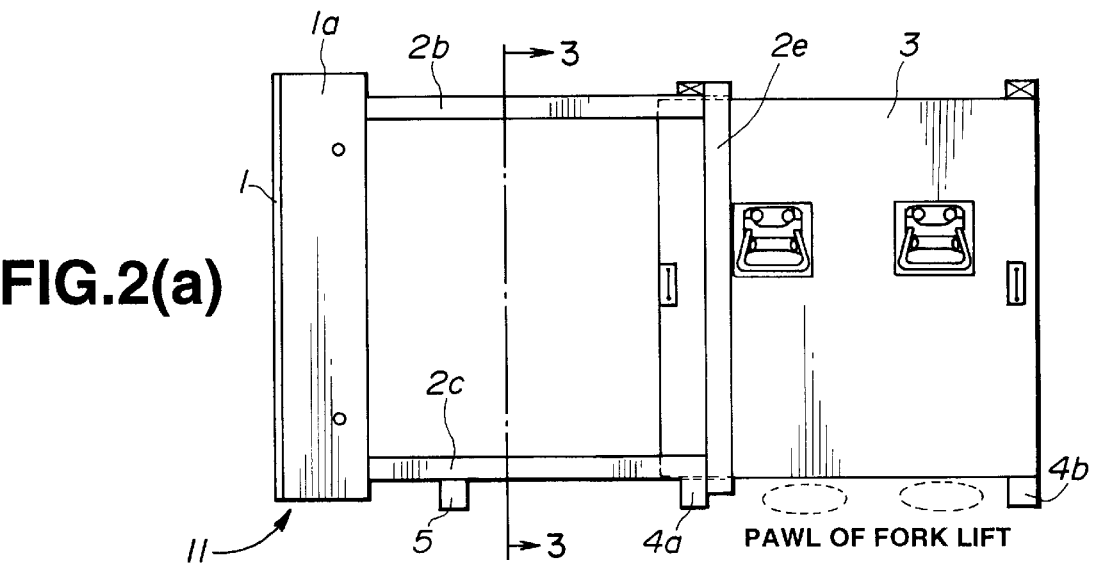
FIG. 2(a) is a side view showing a projector unit with a screen projecting part.
Figure 2B:
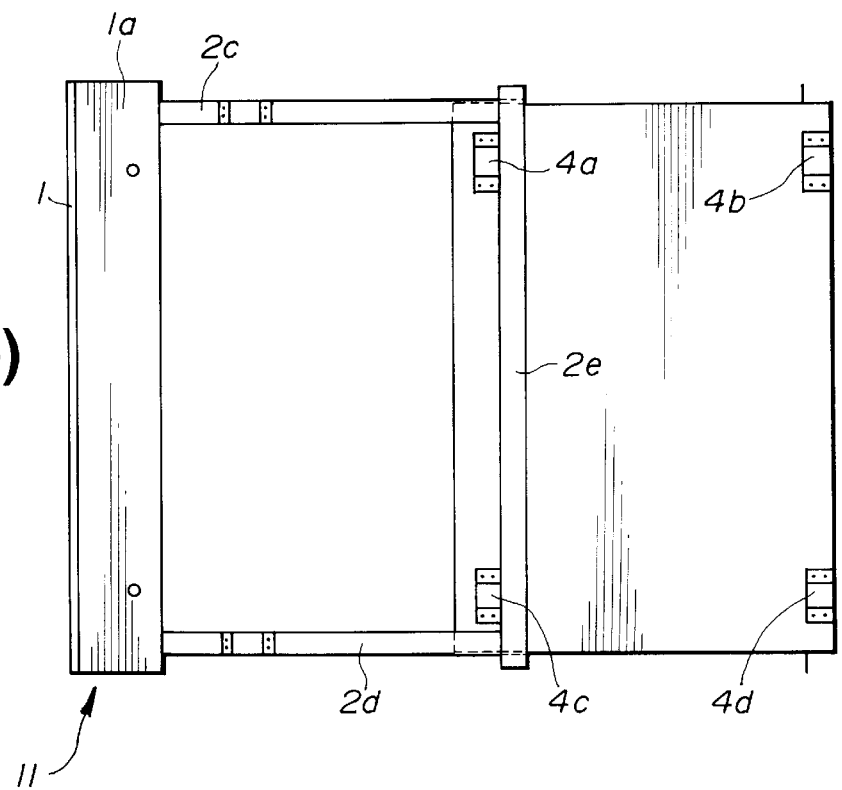
FIG. 2(b) is a bottom view of the projector unit shown in FIG. 2(a).

FIG. 2(a) shows a side view in which the screen 1 is extended outwardly and FIG. 2(b) shows a bottom view of the same.

It is understood from the side view of FIG. 2(a) that a small space is formed below the projecting part 3 and the L-shaped metal fittings 2c and 2d due to the leg parts 4a and 4b. Therefore, it is possible to prevent all the bottom parts of the L-shaped metal fittings 2c and 2d from contacting a floor surface. Thus, it is possible to avoid a construction in which friction is applied to the floor. When transporting or piling up this cabinet, it will be possible to lift the projector unit easily if the pawls of a fork lift are inserted into the space formed underneath. The bottom view of FIG. 2(b) shows the positions of the leg parts 4a–4d. The leg parts 4a–4d are provided at the positions such that they do not interfere with the sliding of the L-shaped metal fittings 2c and 2d. Furthermore, as the weight of the projecting part 3 is heavier than that of the screen 1, it will be possible to lift the projector unit up by inserting a fork lift thereunder when the screen 1 is pulled out.

Figure 3:
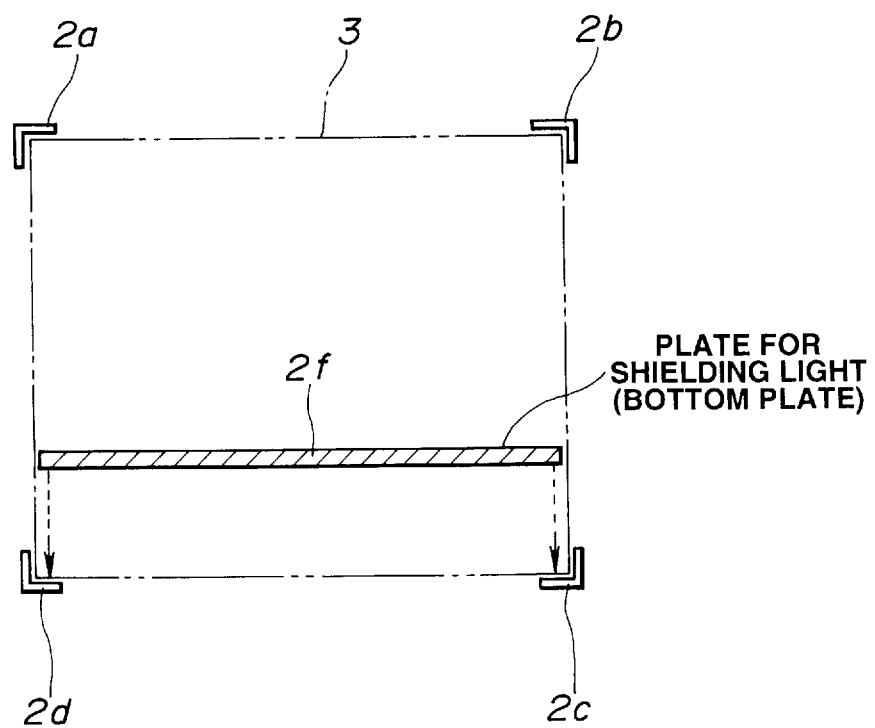
FIG. 3 is a cross section view showing a section taken along the line 3—3 of FIG. 2(a).
Figure 10:
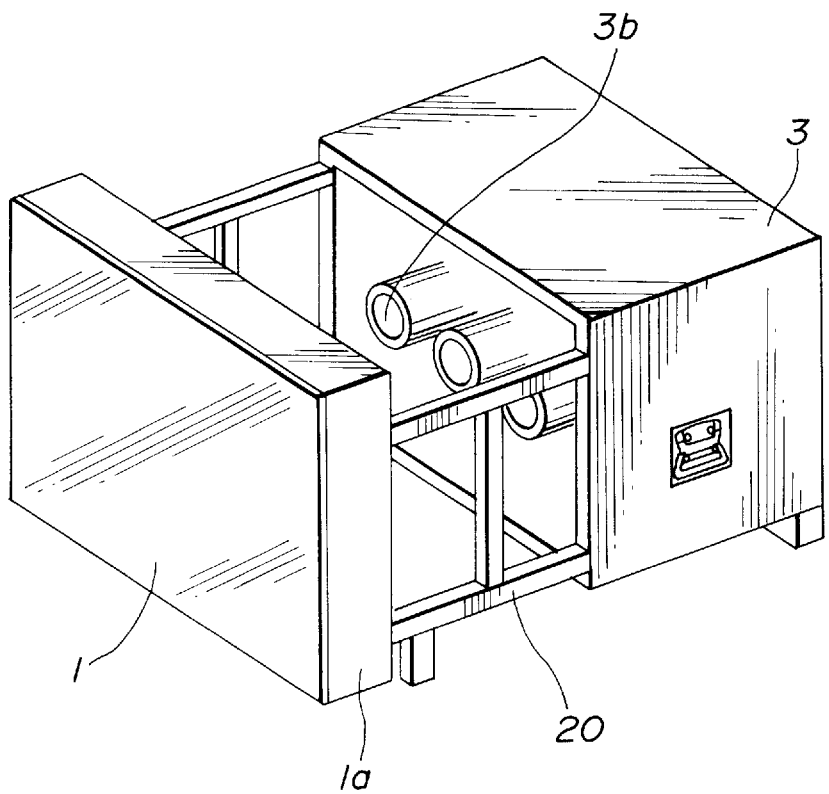
FIG. 10 is a perspective view showing a cabinet structure of a conventional multiscreen displaying apparatus.
Figure 11:
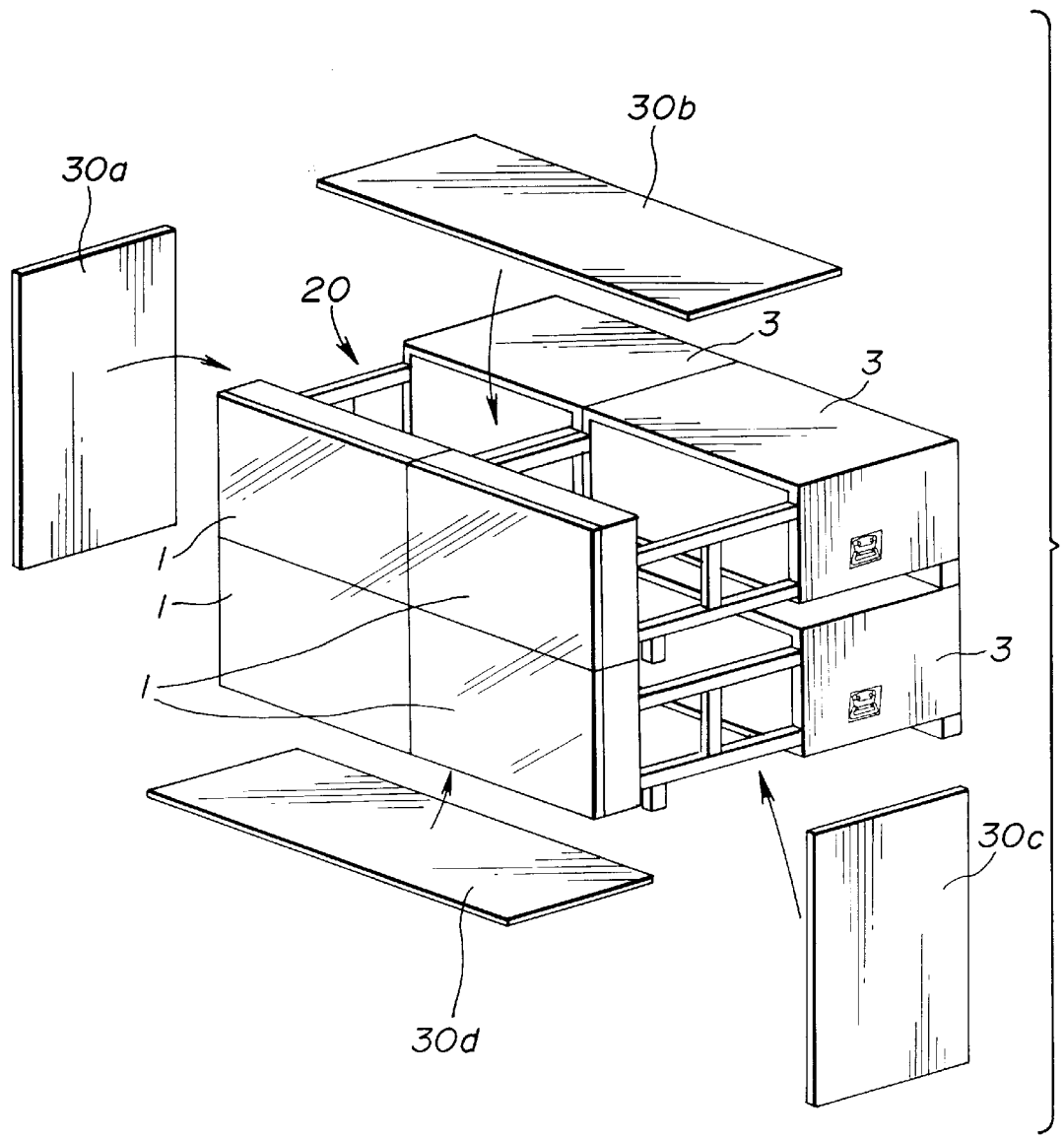
FIG. 11 is a perspective view showing the cabinets of FIG. 10 stacked up.

Because the frame 2 is the outermost part under the condition in which the screen 1 is pulled forward to an outwardly extended position, even if the frame 2 is covered with a blackout curtain, an optical path from the projecting part 3 will not be shielded. Thus, it is possible to set up the blackout curtain without it being loosened if tension is applied to the blackout curtain so that the outermost part is used as a frame. Therefore, an accident such as the upper blackout curtain becoming loosened to shield the optical path will not occur. Therefore, it is possible to shield the outer light easily without providing the outer plate of FIG. 10. A bottom plate 2f supported by the inner surfaces of the L-shaped metal fittings 2c and 2d is provided at the bottom. This bottom plate 2f is shown in FIG. 3.

As the L-shaped parts are conveniently formed to be like a receiver of a shelf plate, it is possible to put this bottom plate 2f on the inner surfaces of the L-shaped metal fittings 2c and 2d without fixing it with screws. Furthermore, because gaps are not formed between the adjacent cabinets of the individual projectors when the L-shaped metal fittings 2a–2d are installed with a width almost the same as that of the screen fitting frame 1a, it is possible to shield the outer light on the side of the bottom plate completely.

Furthermore, as the L-shaped metal fittings 2a–2d are positioned at an outermost position, it is possible to provide a space formed by the four L-shaped metal fittings wide enough to permit operation inside that space.

Figure 4:
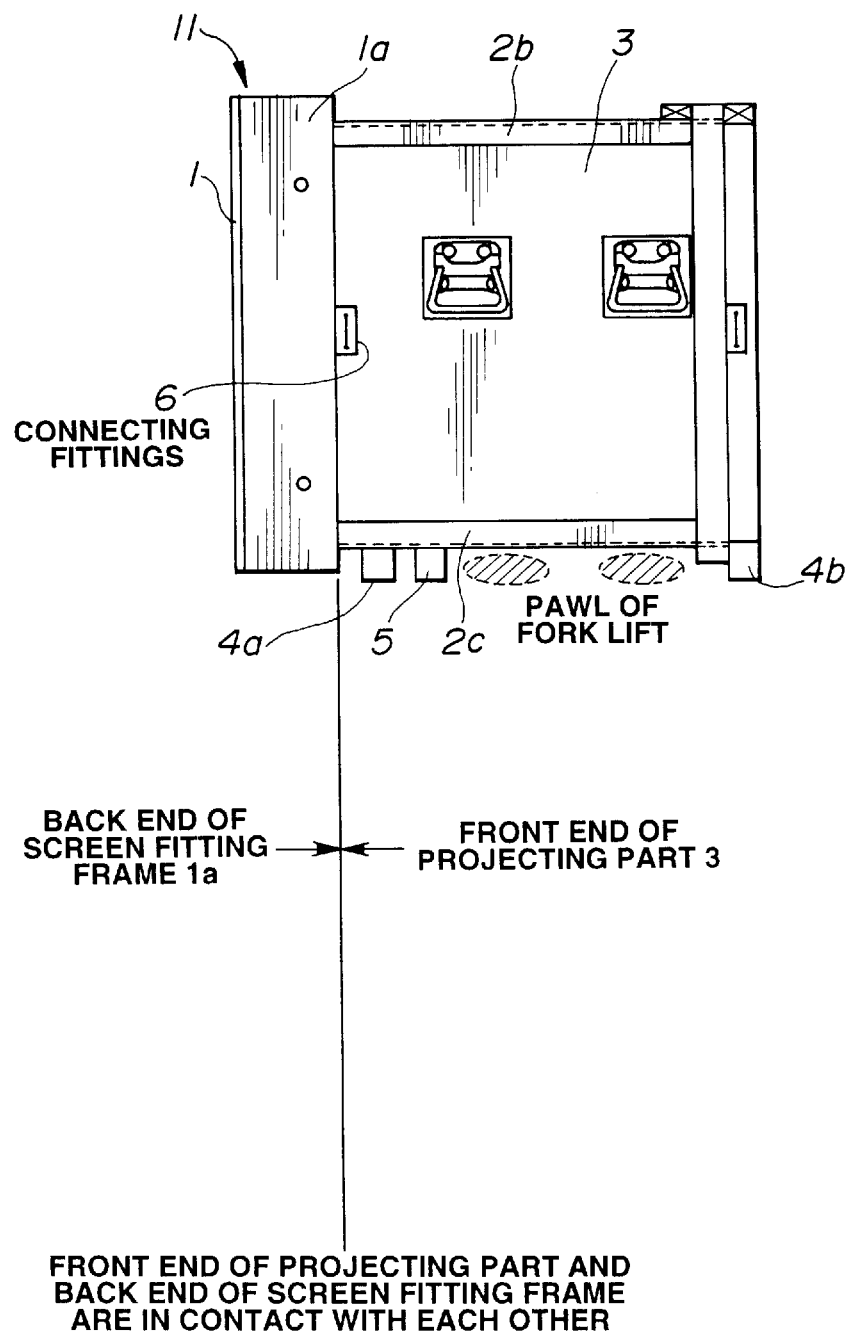
FIG. 4 is a side view showing a projector unit with the screen retracted with respect to the projecting part.

FIG. 4 shows the screen 1 being retracted into the projecting part 3 to its retracted position. The space provided below the projection unit makes the operation of using a fork lift to lift the unit very easy. As it is stored under this condition in transporting, space efficiency is improved. Furthermore, because the projecting part 3 is housed within the frame 2 and, as a whole, one rectangular parallelepiped is formed. Thus, applying a concentrated load on the frame 2 is avoided when handling a load. Therefore, the frame 2 is prevented from being broken and it is possible to handle the load safely. Furthermore, it is possible to fix the rear end of the screen fitting frame 1a to the front end of the projecting part 3 by using joint metal fittings 6 to secure and safely transporting.

Characteristics in the case of piling up units having the cabinet structure according to the present invention or of fixing it to a fixing stand will be described.

Efficiency of operability by a fork lift or the like is improved and it is possible to obtain the following effect.

Figure 5:
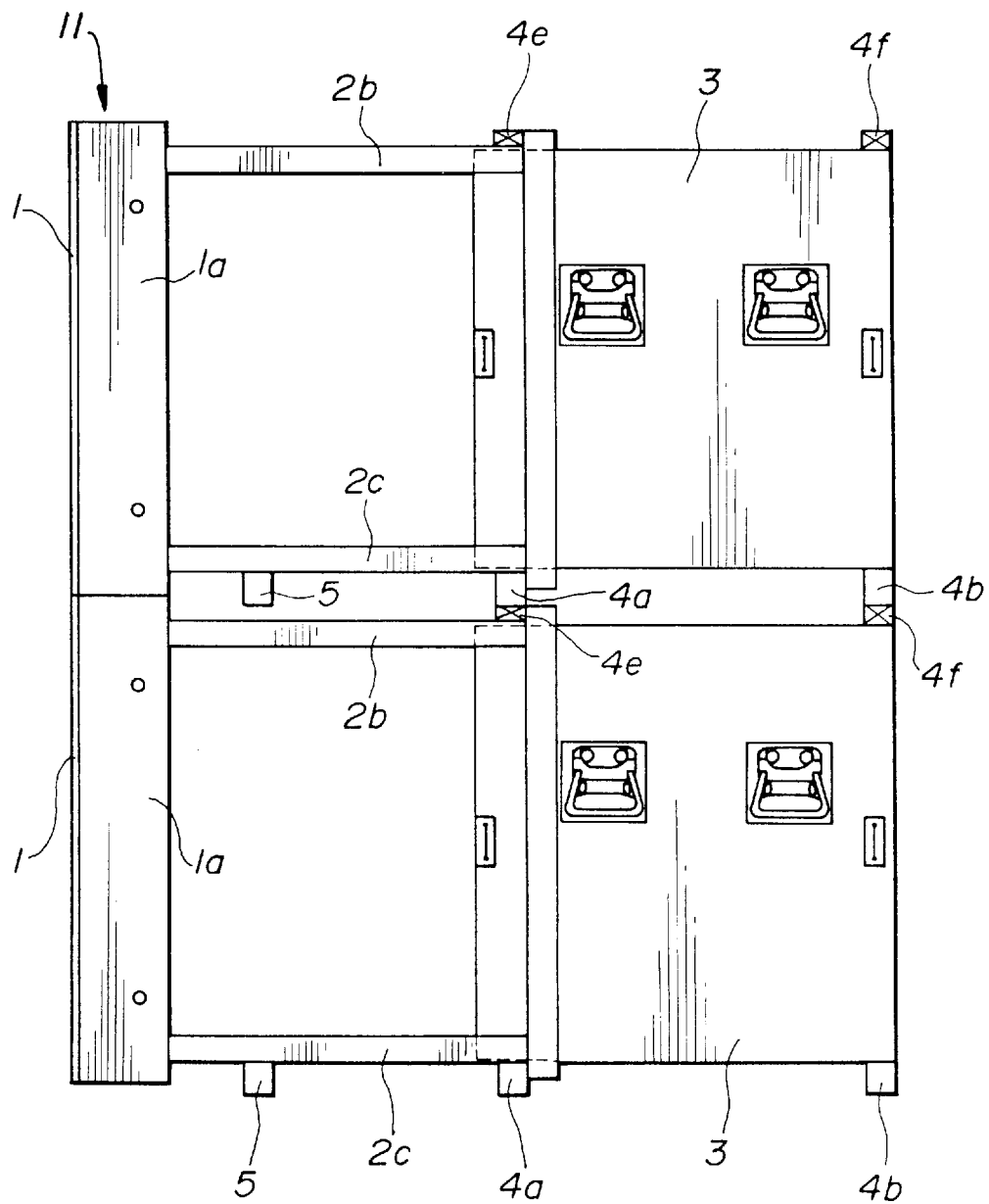
FIG. 5 is a side view in which two cabinets of FIG. 1 are piled up.

First, the case of stacking a plurality of projectors will be described. FIG. 5 is a side view showing the screen 1 being pulled out to an extended position and the stacking up of two units.

Because the leg supports 4e and 4f have leg parts 4a–4d (only 4a and 4b are shown due to a side view in FIG. 5) attached thereto as shown in FIG. 5, it is possible to align the positions of the upper and lower units by putting the leg parts 4a–4d on the leg supports 4e and 4f. Furthermore, a joint mechanism may be used to fix the leg parts 4a–4d and the leg supports 4e and 4f by fittings or the like is provided, and it will thus be possible to connect the upper unit with the lower unit securely.

Figure 6:
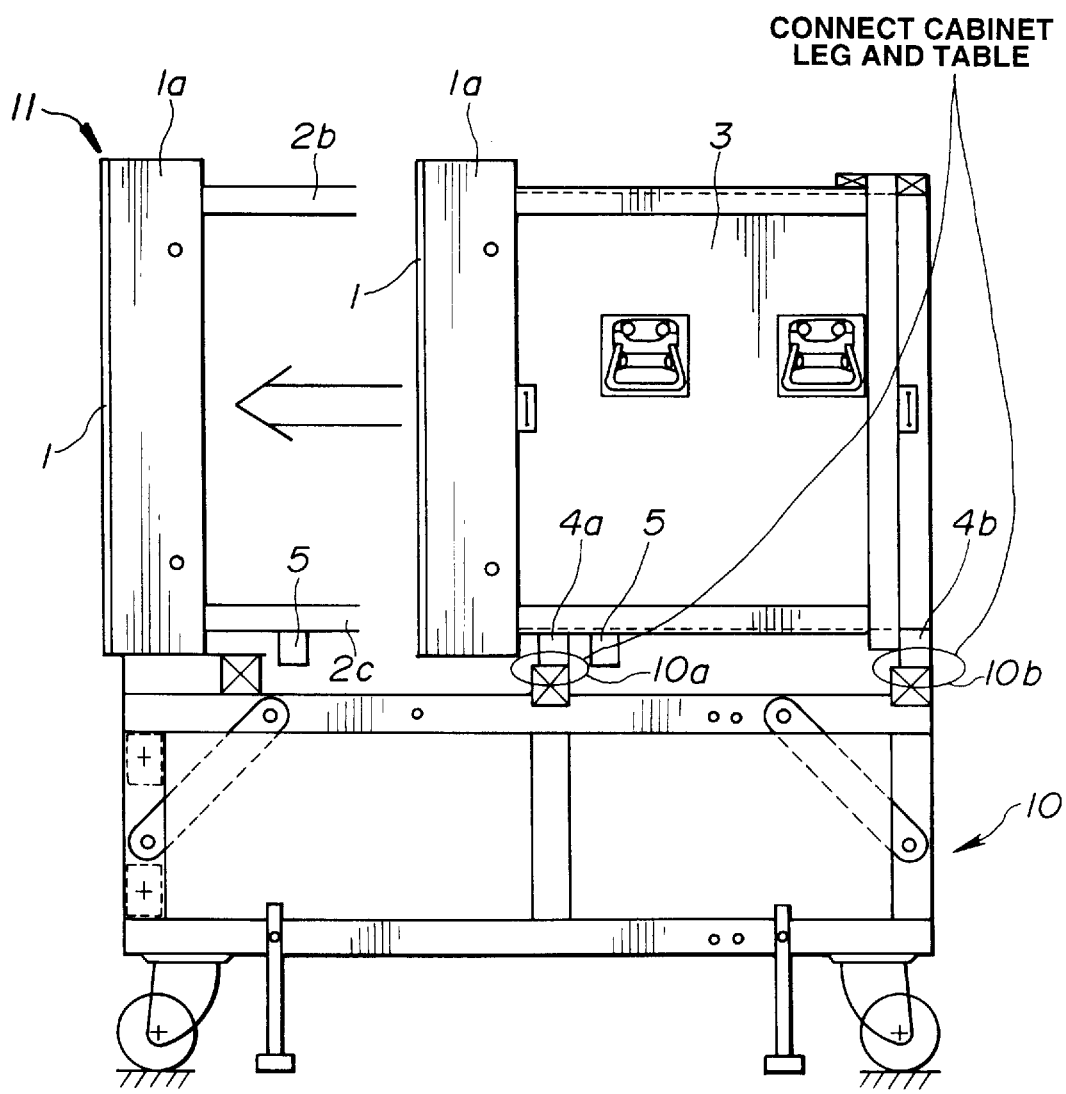
FIG. 6 is a side view with the cabinet of FIG. 1 fixed to a movable fixing stand.

Furthermore, a cabinet according to the present invention may be mounted on a fixing table 10 as shown in FIG. 6. When putting a projecting part 3 on the movable fixing table 10 and fixing leg parts 4a–4d to fixing parts 10a–10d of the table 10, it is possible to easily form a projector for enlargement projection by pulling out the screen 1 to its extended position. FIG. 6 shows only 4a, 4b and 10a, 10b similarly to FIG. 5 due to the side view. If a concave and convex parts are provided so that the leg parts 4a–4d are engaged with the fixing parts 10a–10d of the table 10, the projecting part 3 can be fixed to the table securely, enabling operation of the projector to be performed safely.

Figure 7:
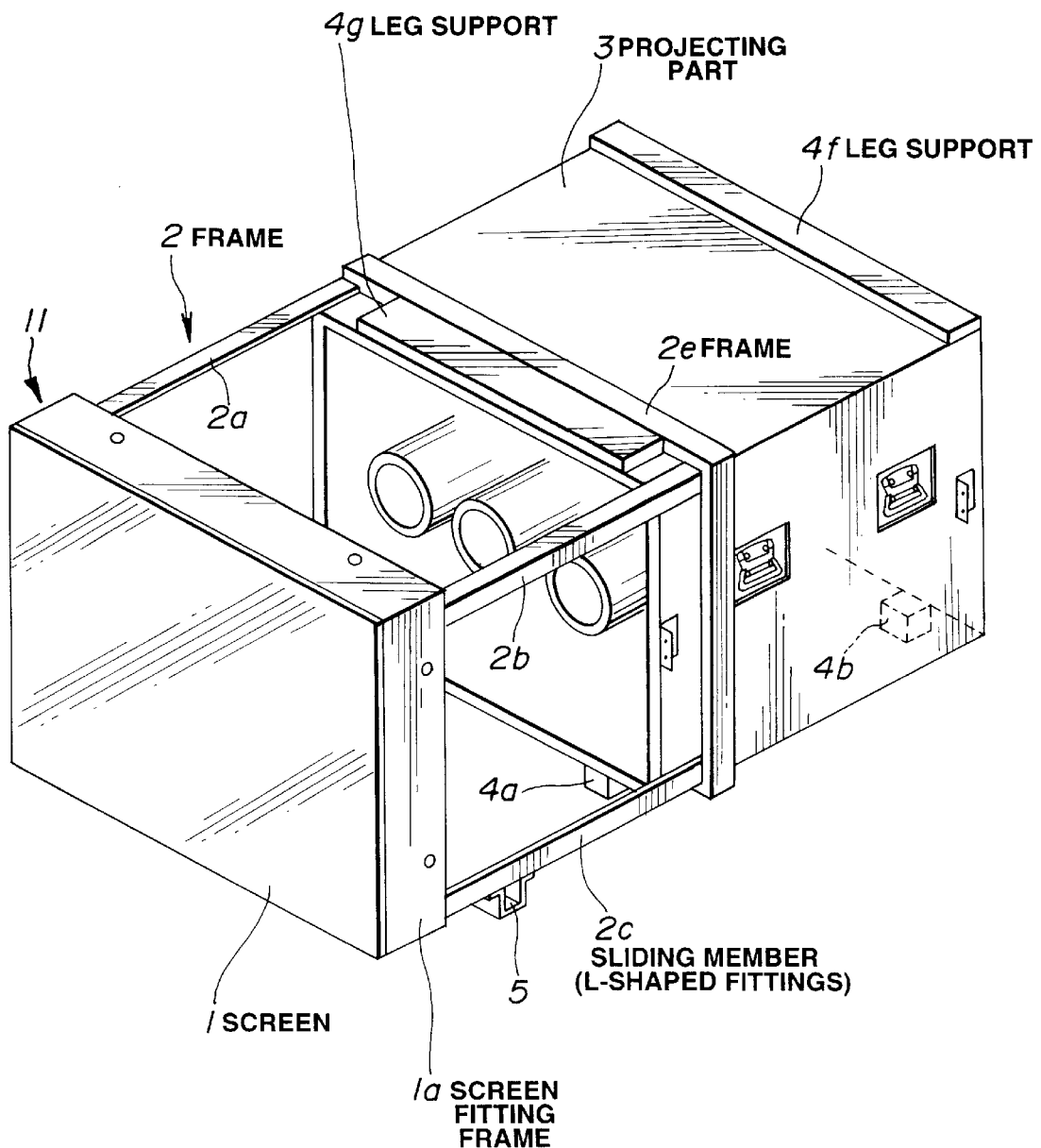
FIG. 7 is a perspective view showing the cabinet structure of another embodiment according to the present invention.

Furthermore, FIG. 7 is an alternate embodiment according to the present invention. The leg support 4e is provided on the side of the frame in FIG. 1, but the leg support 4g is provided on the side of the projecting part in FIG. 7. As the leg support 4e is provided on the side of the frame in FIG. 1, the projector units should be piled up after screens 1 are pulled up. However, because the leg support 4g is set at the predetermined position from the beginning, it is made possible to pull out the frame after the projector units are piled up.

Figure 8:
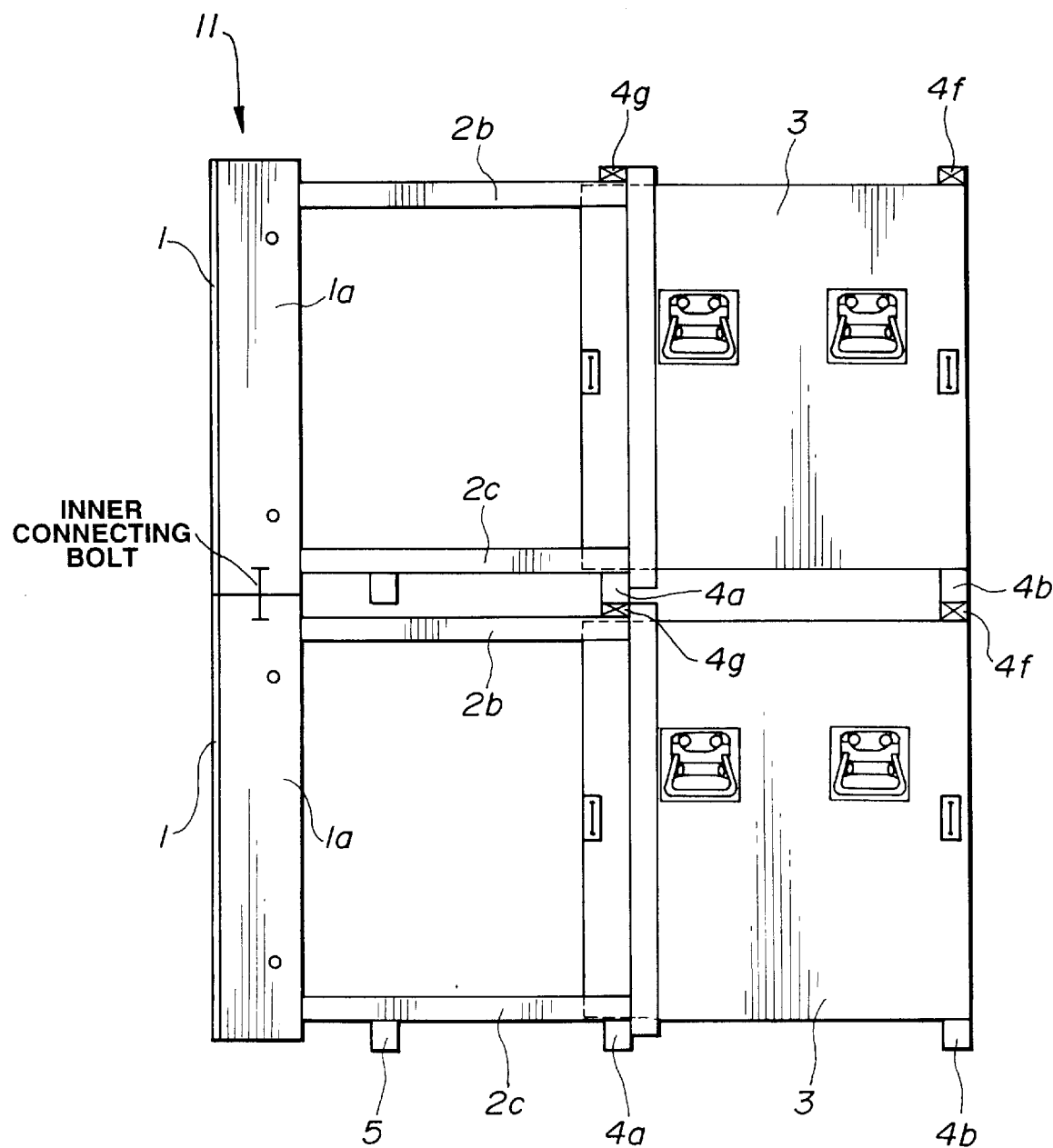
FIG. 8 is a side view showing a multiscreen displaying apparatus in which two cabinets of the embodiment in FIG. 7 are stacked together.

As shown in FIG. 7, the leg support 4g is provided on the upper surface of the projecting part 3 and at the position that is not in contact with the L-shaped metal fittings 2a, 2b. As the leg parts 4a and 4c and the leg support 4g are fixed to each other between the upper and lower projector units as shown in FIG. 8 when they are piled up, it is possible to pull out the screen 1 after they are piled up. Therefore, it is also possible to adjust the position of the screen when the units are stacked.

Figure 9:
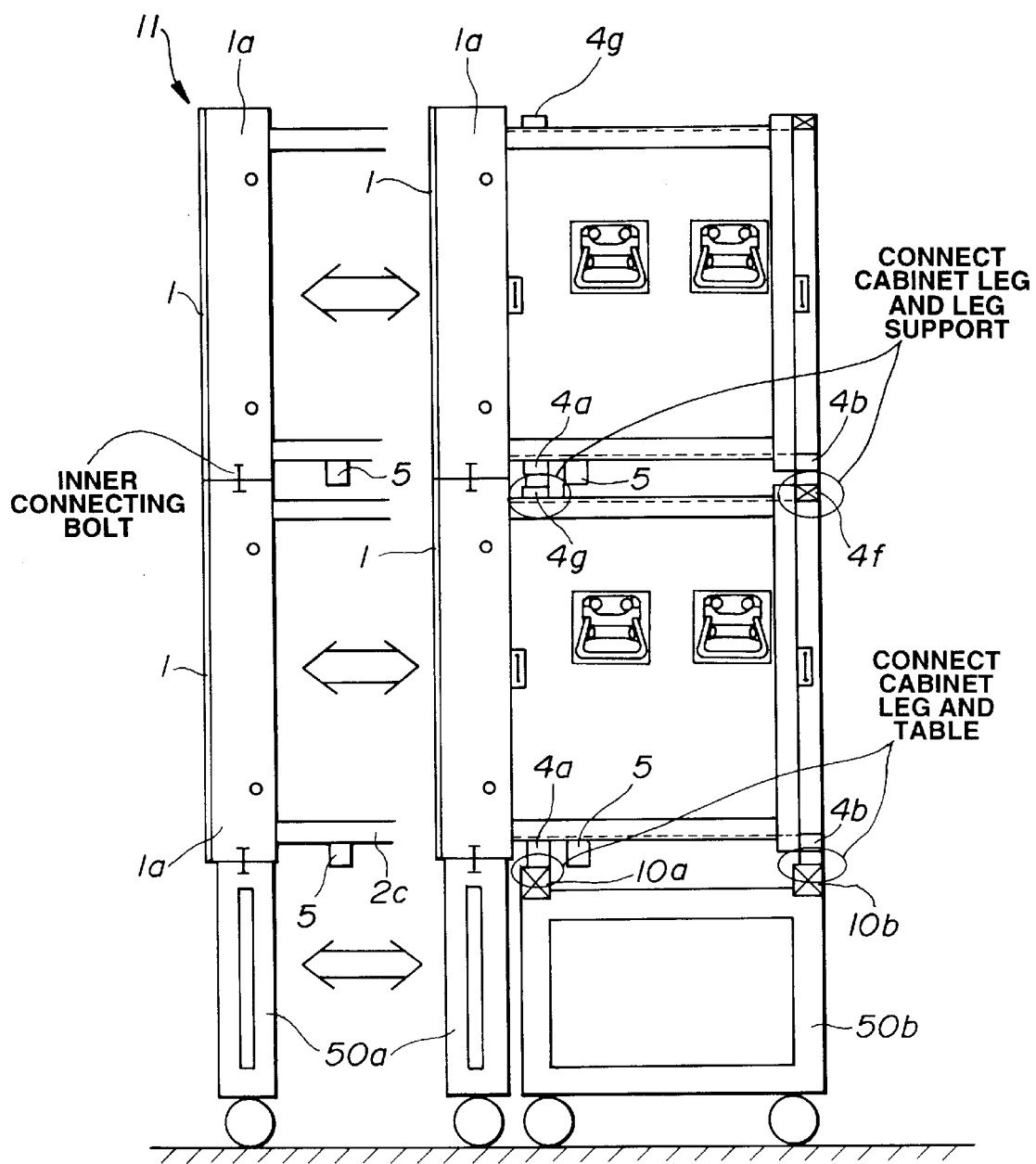
FIG. 9 is a side view with the multiscreen displaying apparatus in FIG. 8 fixed to a movable fixing stand.

Furthermore, the case of fixing the multiscreen display of FIG. 8 to a fixing table will be described referring to FIG. 9. In FIG. 9, an improvement is shown that a fixing table part is improved by having a characteristic that makes it possible to pull out the screens 1 after projector units are piled up. Here, the fixing part is divided into two parts and the screens 1 and the projecting part 3 are put on separate fixing tables 50a and 50b respectively. That is, in order to make pulling-out operation smoothly, a fixing frame 1a of the screen 1 is put on the fixing table 50a with casters to make movement by the caster possible. The projecting part 3 is fixed to a fixing table 50b. To move the projector units, a fixing table 50b on the side of the projecting part is also provided with casters and the projecting part 3 is fixed by a stopper only in the case of pulling them out. Furthermore, it is also possible to move all of the screens by the casters at a time by connecting the screen (a fitting frame 1a) of each unit with a bolt or the like when the projector units are piled up.

As it is natural that it is possible to connect screens not only vertically but also horizontally, it is possible to move all of the screens by utilization of the casters at the same time regardless of the number of screens. Thus it is possible to previously assemble a multiscreen display comprising four surfaces and to transport it. That is, as the screen is retracted into the projecting parts 3 when transporting and moving, it becomes very easy to handle.

Furthermore, in the composition of a multiscreen display, as it is possible to adjust the position of all the screens only by pulling out the screen fitting frame 1a, it is possible to obtain the proper condition of receiving images at once and to restore the enlarged image very simply. As it is possible to secure safety of operation for installing the multiscreen display and to put the units on the movable tables, the position of the multiscreen display in a room or hall for projecting images can be changed easily.

As mentioned above, according to the present invention, by uniting a frame slightly larger than the outer periphery of the projecting part to the screen and by making only the screen or the projecting part slidable, the projector units can be made lighter and compact by sliding either of them. Furthermore, as the frame connected with the screen part is a little larger than the outer periphery of the projecting part, it is possible to shield outer light simply by using the frame as the support of the blackout curtain without providing an outer plate. Furthermore, when lifting units by a fork lift or the like, it is easy to insert the claw parts in the space provided underneath the projector, thereby improving operability.

Furthermore, it is possible to set the screen at the predetermined extended position in projecting. Therefore, it is possible to improve space efficiency in transporting and to enjoy high quality, enlarged images when projecting. Furthermore, if the frame is retracted into the projecting part when stored, it will be possible to prevent dust from entering through the frame part.

Furthermore, because the leg part necessary in piling plural projector units is provided at the lower part of the projecting part and the leg support is provided at the upper part of the projecting part, it is possible to pile up the units with the screen parts pressed into the projecting part and to pull the screen part out of it after they are stacked up. Therefore, it is easy to transport and move the units, or perform the operation by the fort lift. Furthermore, by putting the multiscreen display on a movable table, it becomes easy to move.

The present invention is not limited to only to the above described embodiments but can be variously modified and worked within a range not deviating from the purport of the present invention.

What is claimed is:

1. A multiscreen displaying apparatus comprising a plurality of projectors, each of said projectors comprising:

a projecting part including an optical element adapted to project images;

a screen adapted to display the images projected by said projecting part; and a frame movably mounted on said projecting part, said frame being united with said screen and being configured to house said projecting part therein, said frame being constructed and arranged to permit said screen to be manually moved from a retracted operating position wherein said screen is disposed adjacent said projecting part to an extended operating position wherein said screen is spaced away from said projecting part and supported by said frame.

2. The multiscreen displaying apparatus according to claim 1, wherein said frame comprises:

four L-shaped rail members extending from said screen towards said projecting part, said L-shaped rail members engaging edge parts of said projecting part; and a frame member connecting ends of the L-shaped rail members adjacent said screen.

3. The multiscreen displaying apparatus according to claim 1, wherein said projecting part further comprises:

a leg part disposed at a bottom side of an end of said projecting part toward said screen; and a leg part disposed at a bottom side of an end of said projecting part away from said screen.

4. The multiscreen displaying apparatus according to claim 3, wherein said projecting part further comprises:

a leg support disposed at an upper side of an end of said projecting part toward said screen; and a leg support disposed at an upper side of an end of said projecting part away from said screen.

5. The multiscreen displaying apparatus according to claim 1, further comprising a connecting element connecting said projecting part with said screen when said projecting part is housed in said frame.

6. The multiscreen displaying apparatus according to claim 1 further comprising a connecting element connecting said projecting part of a first of said projectors and said projecting part of a second of said projectors to one another when said first projector is stacked on top of said second projector.

7. The multiscreen displaying apparatus according to claim 1 further comprising a movable fixing table disposed under a bottom projector of a stack of said projectors.

8. The multiscreen displaying apparatus according to claim 7, wherein said fixing table comprises a screen supporting part supporting said screen and a projecting part supporting part supporting said projecting part.

* * * * *